Sept. 15, 1942.     J. WIDMAN     2,295,982

PUMP UNIT AND STAND

Filed April 13, 1939

INVENTOR:
JOSEPH WIDMAN,
BY: Christian R. Nielsen
ATTORNEY

Patented Sept. 15, 1942

2,295,982

UNITED STATES PATENT OFFICE 2,295,982

PUMP UNIT AND STAND

Joseph Widman, Los Angeles, Calif.

Application April 13, 1939, Serial No. 267,639

1 Claim. (Cl. 210—170)

This invention relates to a pump unit and supporting stand therefor, and it consists in the constructions, arrangements and combinations herein described and claimed.

It is an object of the invention to provide a pump unit of extreme simplicity, and highly efficient in supplying water to cooling systems of dwellings or for humidifying air generally.

It is an object of the invention to provide a pump unit and stand of a portable character which may be installed within a tank of water without the use of bolts or similar fastenings.

It is a still further object of the invention to provide a pump unit in which the impeller is horizontally disposed and in which the vanes thereof are canted in a manner to provide a lifting effect thereto when rotated in the water, thereby avoiding the need for supporting bearings for the drive shaft, and reducing wear and strain upon the bearings of the driving motor.

Additional objects, advantages and features of invention will be apparent from the following description considered in conjunction with the accompanying drawing, wherein Figure 1 is a fragmentary sectional view through a tank having my unit installed.

Figure 4 is a top plan view of the impeller.

Figure 5 is a side elevation thereof.

There is illustrated a tank 10 of any suitable size and construction, this depending upon the particular use to which the unit is to serve, but in any event the tank must be water-tight to maintain a supply of water.

Figure 3:
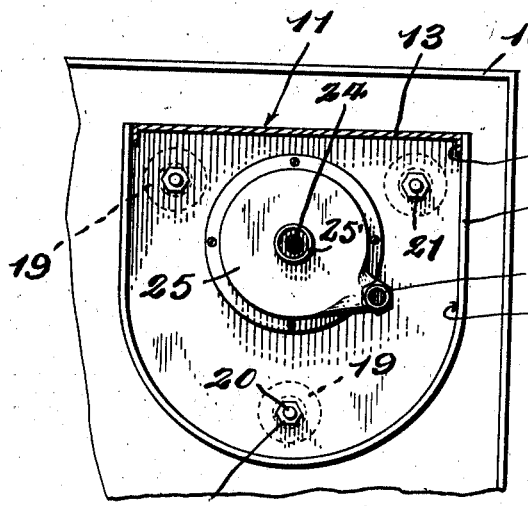
Figure 3 is a cross section on the line 3—3 of Figure 1.

A motor stand generally indicated at 11 is employed, comprising a shallow pan 12, from one end of which the wall 13 is extended upwardly a substantial distance for support of an electric motor 14, as will be described hereinafter. The wall 13 has a right angular side portion 15 on the vertical edges, affording rigidity to the wall as well as providing a surface for securement of a frame 16 of a screen device 17. The frame 16, as shown is formed from a U-shaped strap between which a bronze screen 18 is secured, the frame 16 being substantially U-shaped, as shown in Figure 3, the ends being secured to the portions 15 by rivets or otherwise.

The screen 18 snugly fits the tray or pan 12, and the mesh of the screen is such as to permit free passage of water but prevent passage of foreign matter therethrough. Thus the pump is protected against clogging or damage due to encountering obstructions which may be carried along in the water.

Upon the under side of the pan 12, there are provided a series of suction cups 19. The cups may be secured to the pan 12 in any approved manner and as here shown, the cups include a threaded shank 20 which is extended through an aperture in the pan and secured by a nut 21. Any number of cups may be employed, three being shown in the present instance. It has been found that these cups afford a very secure and positive retention of the stand when applied to the base of the tank, the water in the tank materially assisting in maintaining suction between the cups and the base of the tank.

Figure 1:
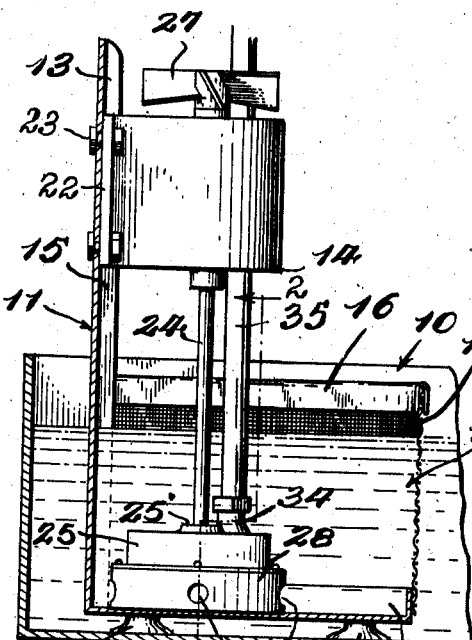
Figure 2:
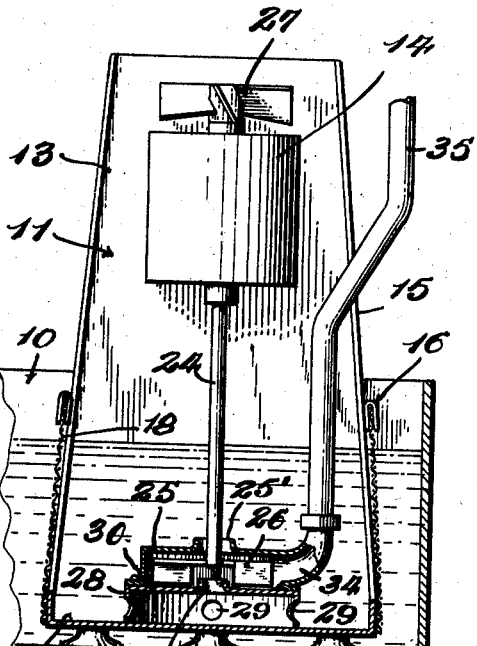
Figure 2 is a similar view at right angles to Figure 1, the pump being shown in section.

As shown in Figure 1, the motor 14 has a foot 22 apertured at suitable points aligned with apertures formed in the wall 13 and through these apertures bolts 23 are secured, thereby supporting the motor in a position above the pan 12.

The motor 14 has a shaft 24 extending downwardly into a pump casing 25, the lower end having fixed thereto an impeller 26. The shaft 24 lies parallel to the wall 13 and passes freely through the pump casing by reason of the enlarged collar 25′, the only support of the shaft being the bearings of the motor. The upper end of the shaft 24 has fixed thereto a fan 27 for motor cooling purposes, as well as to afford a slight lifting effect upon the impeller 26.

The pump casing 25 comprises a base 28 of annular hollow shape, the wall of which is provided with a series of openings 29 to admit water therewithin and the upper wall 30 is provided with a water outlet 31 opening axially of the pump casing 25.

The impeller 26, in the present instance, embodies four blades, arranged in pairs at right angles to each other. Each of the blades comprises a flat slightly upwardly inclined portion 32 and a trailing portion 33, the latter being disposed at an angle, as clearly shown in Figures 5 and 6, the function of which will appear hereinafter.

The casing 25 has an outlet 34 to which there is connected a pipe 35, for connecting water to the source of use.

In use, when the motor 14 is energized, the impeller 26 will be rotated and the suction created will draw water through the openings 29 and upwardly through the outlet 31. The blades by reason of the inclined portions 33 and the upward inclination of the flat portion of the blades will exert an upward lift. As the blades pass the outlet 34 water will be forced upwardly through the pipe 35 to its point of use.

While I have shown and described a preferred construction, this is by way of illustration only, and I consider as my own all such modifications in structure as fairly fall within the scope of the appended claim.

I claim:

A portable stand for a pump unit comprising a shallow pan adapted to be positioned in a receptacle containing a body of liquid, said pan having an upright wall at one end for support of a pump unit, suction cups on the under side of the base of the pan affording support of the unit upon the bottom wall of the receptacle, and a vertically disposed screen mesh guard being fixed to the upright wall of the pan to enclose the sides and an end wall of the pan.

JOSEPH WIDMAN.